United States Patent
Popescu et al.

(10) Patent No.: US 11,037,183 B2
(45) Date of Patent: Jun. 15, 2021

(54) SYSTEM AND METHOD FOR BLENDING PROMOTION EFFECTS BASED ON STATISTICAL RELEVANCE

(71) Applicant: ORACLE INTERNATIONAL CORPORATION, Redwood Shores, CA (US)

(72) Inventors: Catalin Popescu, Atlanta, GA (US); Lin He, Johns Creek, GA (US); Jianwu Xu, Alpharetta, GA (US); Ming Lei, Lutherville-Timonium, MD (US)

(73) Assignee: Oracle International Corporation, Redwood Shores (CA)

( * ) Notice: Subject to any disclaimer, the term of this patent is extended or adjusted under 35 U.S.C. 154(b) by 928 days.

(21) Appl. No.: 14/955,141

(22) Filed: Dec. 1, 2015

(65) Prior Publication Data
US 2017/0154349 A1 Jun. 1, 2017

(51) Int. Cl.
G06Q 30/00 (2012.01)
G06Q 10/00 (2012.01)
G06Q 30/02 (2012.01)

(52) U.S. Cl.
CPC ................. *G06Q 30/0211* (2013.01)

(58) Field of Classification Search
CPC ...................................... G06Q 10/00
See application file for complete search history.

(56) References Cited

U.S. PATENT DOCUMENTS

| | | | |
|---|---|---|---|
| 6,910,017 B1* | 6/2005 | Woo | G06Q 10/06 705/7.29 |
| 8,103,538 B2* | 1/2012 | Bamberg | G06Q 10/087 705/7.31 |
| 8,751,289 B2 | 6/2014 | Popkov et al. | |
| 2003/0101107 A1* | 5/2003 | Agarwal | G06Q 10/087 705/28 |
| 2015/0193791 A1* | 7/2015 | Gao | G06Q 30/0202 705/7.31 |
| 2016/0232461 A1 | 8/2016 | Popescu et al. | |
| 2016/0247172 A1 | 8/2016 | Lei et al. | |
| 2016/0283954 A1 | 9/2016 | Lei et al. | |
| 2016/0307218 A1 | 10/2016 | Lei et al. | |

OTHER PUBLICATIONS

Heerde et al., Decomposing the Sales Promotion Bump With Store Data, Summer 2004, Marketing Science, vol. 23, No. 3, pp. 317-334, (Year: 2004).*

(Continued)

*Primary Examiner* — Naresh Vig
(74) *Attorney, Agent, or Firm* — Kraguljac Law Group, LLC

(57) ABSTRACT

Systems, methods, and other embodiments are disclosed that are configured to characterize an effect on sales of a retail item due to a sales promotion. In one embodiment, first sales data for the retail item is retrieved from a plurality of stores that have applied the sales promotion for the retail item. Second sales data for the retail item is retrieved from a single store that has applied the sales promotion for the retail item. A combined promotion effect value is generated based on the first sales data and the second sales data. The combined promotion effect value characterizes an effect on sales of the retail item as sold by the single store due to the sales promotion.

19 Claims, 3 Drawing Sheets

(56) References Cited

OTHER PUBLICATIONS

Profit Margin vs. Inventory Replacement, Mar. 2015, sellercentral.amazon.com (Year: 2015).*
Inventory Replenishment, Inventory Optimization, Demand Forecasting, Sep. 19, 2015, Data Profits (Year: 2015).*
Dr. Panigrahi, Relationship Between Inventory Management and Profitability: An Empirical Analysis of Indian Cement Companies, Jul. 2013, Asia Pacific Journal of Marketing * Management Review, vol. 2 (7) pp. 107-120 (Year: 2013).*

* cited by examiner

SYSTEM AND METHOD FOR BLENDING PROMOTION EFFECTS BASED ON STATISTICAL RELEVANCE

BACKGROUND

A retail business needs to manage its supply chain of products. In one aspect, computer applications are used to manage inventory of products and determine demand forecasts based on promotions. Forecasting demand is a big part of managing a retail business and is a key driver of the supply chain. In retail, when a product is promoted, the sales of the promoted product will usually increase.

Retailers often use promotions to boost sales of items. There are many ways to promote a product (e.g., commercials, price discounts, buy two items and get one item free, etc.). The price discount is used often as a promotion tool and tends to be very effective. However, retailers may use a combination of promotions to boost sales of an item.

Retailers often use the sales and promotion history to calculate the effects of each promotion to manage the demand forecast and inventory for an item. It is desired for the calculation to be performed at a very granular level (e.g., at the item/store intersection) to account for different demographics and geographical locations. For example, a twelve-pack of paper towel rolls may sell very well in a suburban store while, in an in-town store, the demand may be much higher for a single or a two-pack. Retailers can have a large number of item/store/week/promotion intersections that have to be planned.

Generally, the estimation problem is approached in one of two ways. First, the promotional effects may be estimated directly at the item/store level. However, demand and promotion data at this level is insufficient, making estimation very unstable and the results very inaccurate. Second, the effects may be estimated at a more aggregate level (e.g., for all stores in an entire region). The data at the aggregate level is much more stable and the results are more accurate. However, the drawback is the lack of store sensitivity within a region, yielding inaccurate forecasts for individual stores. Currently, retailers typically use either the first or the second approach.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
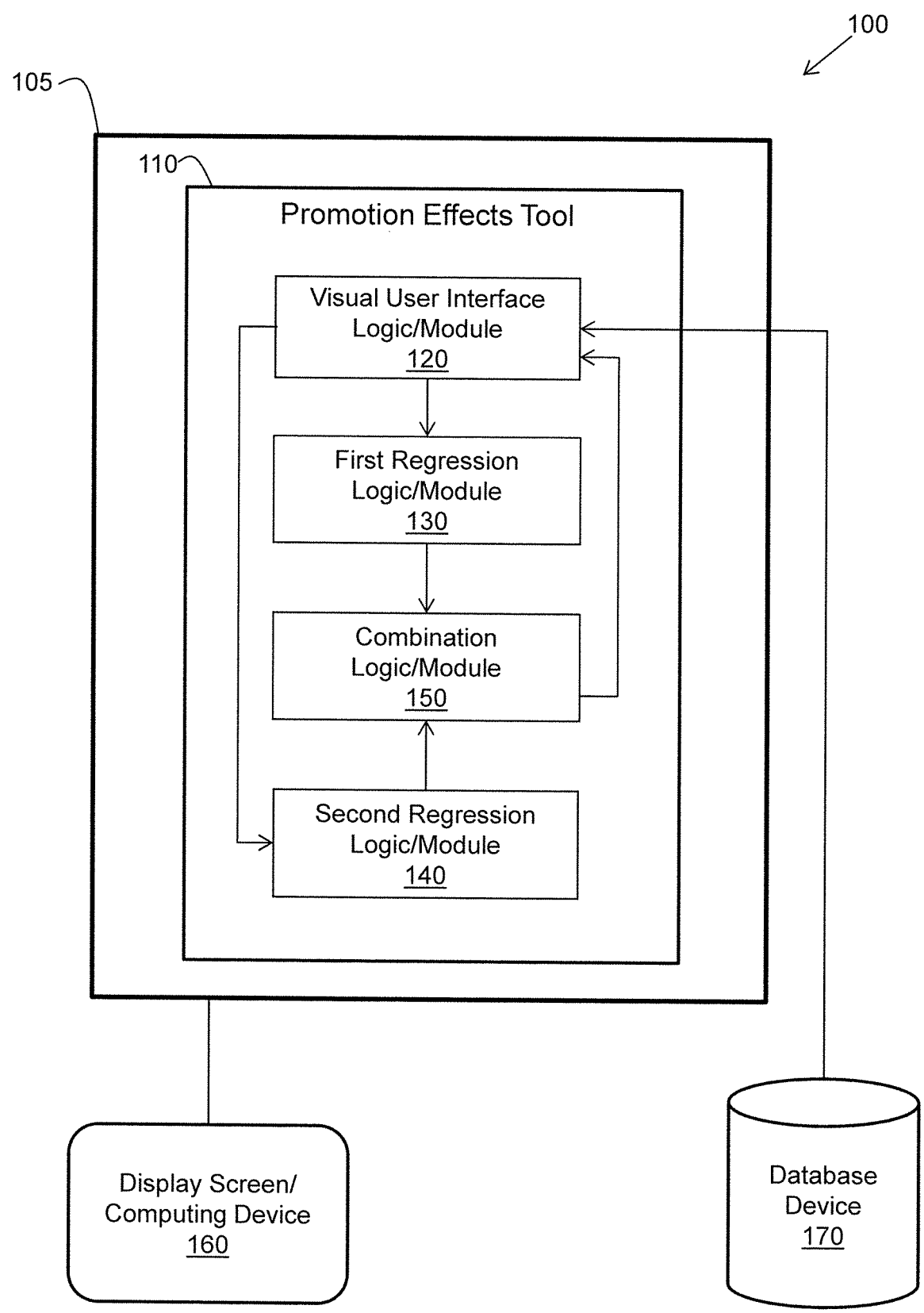
FIG. 1 illustrates one embodiment of a computer system, having a computing device configured with a promotion effects tool.

Systems, methods, and other embodiments are disclosed for generating values representing promotion effects for merchandise retail items. Example embodiments are discussed herein with respect to a computerized system that implements demand forecasting and management of retail data, where sales histories and promotion histories of retail items are taken into consideration.

In one embodiment, a promotion effects tool is disclosed that is configured to estimate an aggregate promotion effect value and a granular promotion effect value and combine them to form a combined promotion effect value. The aggregate promotion effect value represents an estimate of a promotion effect at an aggregate level. For example, the aggregate level may correspond to a class of items across a multiple stores (i.e., an aggregate of items and stores). The granular level may correspond to, for example, a particular item at a particular store (i.e., a granular level). By combining the aggregate promotion effect value with the granular promotion effect value, a combined promotion effect value can be achieved that is more realistic with respect to representing a promotion effect at the granular level (e.g., for a particular item at a particular store). Regression analysis is used to estimate the aggregate and the granular promotion effect values and to generate associated statistical confidence values. The combined promotion effect value characterizes an effect on sales and profitability of a retail item due to a sales promotion for the retail item.

The following terms are used herein with respect to various embodiments.

The term "item" or "retail item", as used herein, refers to merchandise sold, purchased, and/or returned in a sales environment. The terms "particular item" and "single item" are used interchangeably herein and refer to a particular item type (e.g., to a particular type of cellular telephone such as an iPhone 6S), not to a unit item.

The terms "period", "time period", "retail period", or "calendar period", as used herein, refer to a unit increment of time (e.g., a 7-day week) which sellers use to correlate seasonal periods from one year to the next in a calendar for the purposes of planning and forecasting. The terms may be used interchangeably herein.

The term "sales channel" or "location" or "retail location", as used herein, may refer to a physical store where an item is sold, or to an on-line store via which an item is sold.

The term "sales data", as used herein, refers to historical sales and promotion information that has been recorded for an item that has been sold in past retail periods (e.g., over 52 weeks of the past year). Sales data may include, for example, a number of units (or a monetary amount) of an item sold in each retail period, along with data characterizing one or more types of promotions for the item. Sales data may be stored in a database device, for example.

The terms "promotion component" and "sales promotion" are used interchangeably herein and refer to a particular type of promotion for an item. Some examples of promotion components may include a price discount promotion component, a television advertisement component, a radio advertisement component, a newspaper advertisement component, an internet advertisement component, an email advertisement component, and an in-store advertisement component.

The terms "promotion effect value" and "profitability estimate" are used interchangeably herein and refer a numerical value that characterizes the effect (e.g., the effect on sales and profitability) of promoting an item. For example, an estimated promotion effect value of 2.0 may indicate that a promotion, or combination or promotions, is estimated to result in twice as many sales (a 100% increase) for an item. Promotion effect values may be used in a demand forecast model to forecast a demand for an item. Promotion effect values may also be used in a computerized inventory system to control various aspects of inventory for an item.

FIG. 1 illustrates one embodiment of a computer system 100, having a computing device 105 configured with a promotion effects tool 110. For example, in one embodiment, the promotion effects tool 110 may be part of a larger computer application (e.g., a computerized inventory management and demand forecasting application), configured to forecast and manage sales, promotions, and inventory for retail items at various retail locations. The promotion effects tool 110 is configured to computerize the process of analyzing sales data to generate promotion effect values that may be used by a demand model to forecast demand for items. The embodiments described herein take into consideration promotion effects at different levels.

In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

In one embodiment, a computer algorithm is disclosed that implements an analytical approach to determining promotion effect values for an item, or a class of items, at a store, or at multiple stores. It is assumed herein that sales data is available for use and that a demand model is defined which can be used for performing regression analyses on the sales data.

The forecast is an important driver of the supply chain. If a forecast is inaccurate, allocation and replenishment perform poorly, resulting in financial loss for the retailer. Improvements in forecast accuracy for promoted items may be achieved by the embodiments disclosed herein. Furthermore, a better understanding of the impact a promotion has on demand may be achieved. This helps the retailer to more effectively plan promotions with respect to channel, pricing, and customer segments, for example.

With reference to FIG. 1, in one embodiment, the promotion effects tool 110 is implemented on the computing device 105 and includes logics or modules for implementing various functional aspects of the promotion effects tool 110. In one embodiment, the promotion effects tool 110 includes visual user interface logic/module 120, first regression logic/module 130, second regression logic/module 140, and combination logic/module 150.

Other embodiments may provide different logics or combinations of logics that provide the same or similar functionality as the promotion effects tool 110 of FIG. 1. In one embodiment, the promotion effects tool 110 is an executable application including algorithms and/or program modules configured to perform the functions of the logics. The application is stored in a non-transitory computer storage medium. That is, in one embodiment, the logics of the promotion effects tool 110 are implemented as modules of instructions stored on a computer-readable medium.

The computer system 100 also includes a display screen 160 operably connected to the computing device 105. In accordance with one embodiment, the display screen 160 is implemented to display views of and facilitate user interaction with a graphical user interface (GUI) generated by visual user interface logic 120 for viewing and updating information associated with generating promotion effect values (e.g., profitability estimates). The graphical user interface may be associated with a promotion effects application and visual user interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 160 may represent multiple computing devices/terminals that allow users to access and receive services from the promotion effects tool 110 via networked computer communications.

In one embodiment, the computer system 100 further includes at least one database device 170 operably connected to the computing device 105 and/or a network interface to access the database device 170 via a network connection. For example, in one embodiment, the database device 170 is operably connected to visual user interface logic 120. In accordance with one embodiment, the database device 170 is configured to store and manage data structures (e.g., records of sales data) associated with the promotion effects tool 110 in a database system (e.g., a computerized inventory management and demand forecasting application).

Referring back to the logics of the promotion effects tool 110 of FIG. 1, in one embodiment, visual user interface logic 120 is configured to generate a graphical user interface (GUI) to facilitate user interaction with the promotion effects tool 110. For example, visual user interface logic 120 includes program code that generates and causes the graphical user interface to be displayed based on an implemented graphical design of the interface. In response to user actions and selections via the GUI, associated aspects of generating promotion effect values for retail items may be manipulated.

For example, in one embodiment, visual user interface logic 120 is configured to facilitate receiving inputs and reading data in response to user actions. For example, visual user interface logic 120 may facilitate selection, reading, and inputting of sales data (promotion information and unit sales data or monetary sales data) associated with retail items sold at retail locations. The sales data may reside in at least one data structure (e.g., within database device 170) associated with (and accessible by) a promotion effects application (e.g., the promotion effects tool 110) via the graphical user interface. The sales data may be read into a data structure associated with a regression module, for example. The generation of promotion effect values may be based at least in part on the sales data.

Sales data may include, for example, data representing past sales and promotions of an item across a plurality of past retail periods. The sales data may be segmented into retail periods of past weeks, with each past week having numerical values assigned to it to indicate the number of items sold (or monetary amount acquired for items) for that week. The sales data may also include numerical values representing price discounts and values of other promotion components across the retail periods, in accordance with one embodiment. The sales data for an item may be accessed via network communications, in accordance with one embodiment.

Furthermore, visual user interface logic 120 is configured to facilitate the outputting and displaying of promotion effect values, via the graphical user interface, on the display screen 160. In one embodiment, combination logic 150 is configured to operably interact with visual user interface logic 120 to facilitate displaying of promotion effect values of an output data structure. Furthermore, in one embodiment, first regression logic 130 and second regression logic 140 are configured to operably interact with visual user interface logic 120 to receive sales data.

Referring again to FIG. 1, in one embodiment, first regression logic 130 is configured to perform a first regression analysis on first sales data (e.g., for an item or a class of items across multiple sales channels), where the first regression analysis is based on a first demand forecast model. The first regression analysis results in the generation (estimation) of an aggregate level promotion effect value or profitability estimate, where the aggregate level corresponds to, for example, the item or class of items across the multiple sales channels (e.g., different types of shampoos sold across multiple drug stores in a same geographic region). The first regression analysis also results in the generation of a first statistical confidence factor (e.g., a first p-value) corresponding to the aggregate level promotion effect value. The p-value provides a level of confidence in the estimate of the aggregate level promotion effect value.

The first sales data may include unit or monetary sales data for the item or class of items and promotion data associated with one or more promotion components (sales promotions) across a plurality of time periods (e.g., weeks). Examples of promotion components include, but are not limited to, a price discount component, a television advertisement component, a radio advertisement component, a newspaper advertisement component, an email advertisement component, an internet advertisement component, and an in-store advertisement component.

Similarly, in one embodiment, second regression logic 140 is configured to perform a second regression analysis on second sales data (e.g., for a single item sold at a particular sales channel), where the second regression analysis is based on a second demand forecast model. The second regression analysis results in the generation (estimation) of a granular level promotion effect value, where the granular level corresponds to, for example, the single item sold at the particular sales channel (e.g., one particular type of shampoo sold at one particular drug store in the geographic region). The second regression analysis also results in the generation of a second statistical confidence factor (e.g., a p-value) corresponding to the granular level promotion effect value. The p-value provides a level of confidence in the estimate of the granular level promotion effect value.

The second sales data may include unit or monetary sales data for the particular item and promotion data associated with one or more promotion components (sales promotions) across a plurality of time periods (e.g., weeks). The second sales data may be a subset of the first sales data. For example, the first sales data may correspond to a class of items across multiple sales channels, and the second sales data may correspond to a particular item of the class of items and a particular sales channel of the multiple sales channels.

In one embodiment, combination logic 150 is configured to generate a combined promotion effect value (e.g., a combined profitability estimate) by weighting and summing the aggregate level promotion effect value and the granular level promotion effect value. The aggregate level and the granular level promotion effect values are weighted and summed based on the statistical relevance characterized by the first statistical confidence value and the second statistical confidence value.

In one embodiment, the combined promotion effect value controls an amount of inventory (e.g., for an item at a single store) to be ordered by a computerized inventory system (e.g., by a computerized inventory management and demand forecasting system). The combined promotion effect value may also control an amount of inventory (e.g., for an item at a single store) to be allocated by the computerized inventory system. The combined promotion effect value may further control adjustment of an amount inventory (e.g., for an item at a single store) by the computerized inventory system.

In this manner, the promotion effects tool 110 is configured to generate combined promotion effect values that better represent actual effects of a sales promotion of the retail item caused by or due to the sales promotion. The combined promotion effect value is more accurate than that which can be achieved using data from only a single store. Any instabilities, insignificant effects, or gross inaccuracies are compensated for by considering both aggregate level and granular level effects. Details and examples of generating and combining promotion effect values are provided below herein with respect to the discussion of FIG. 2.

Figure 2:
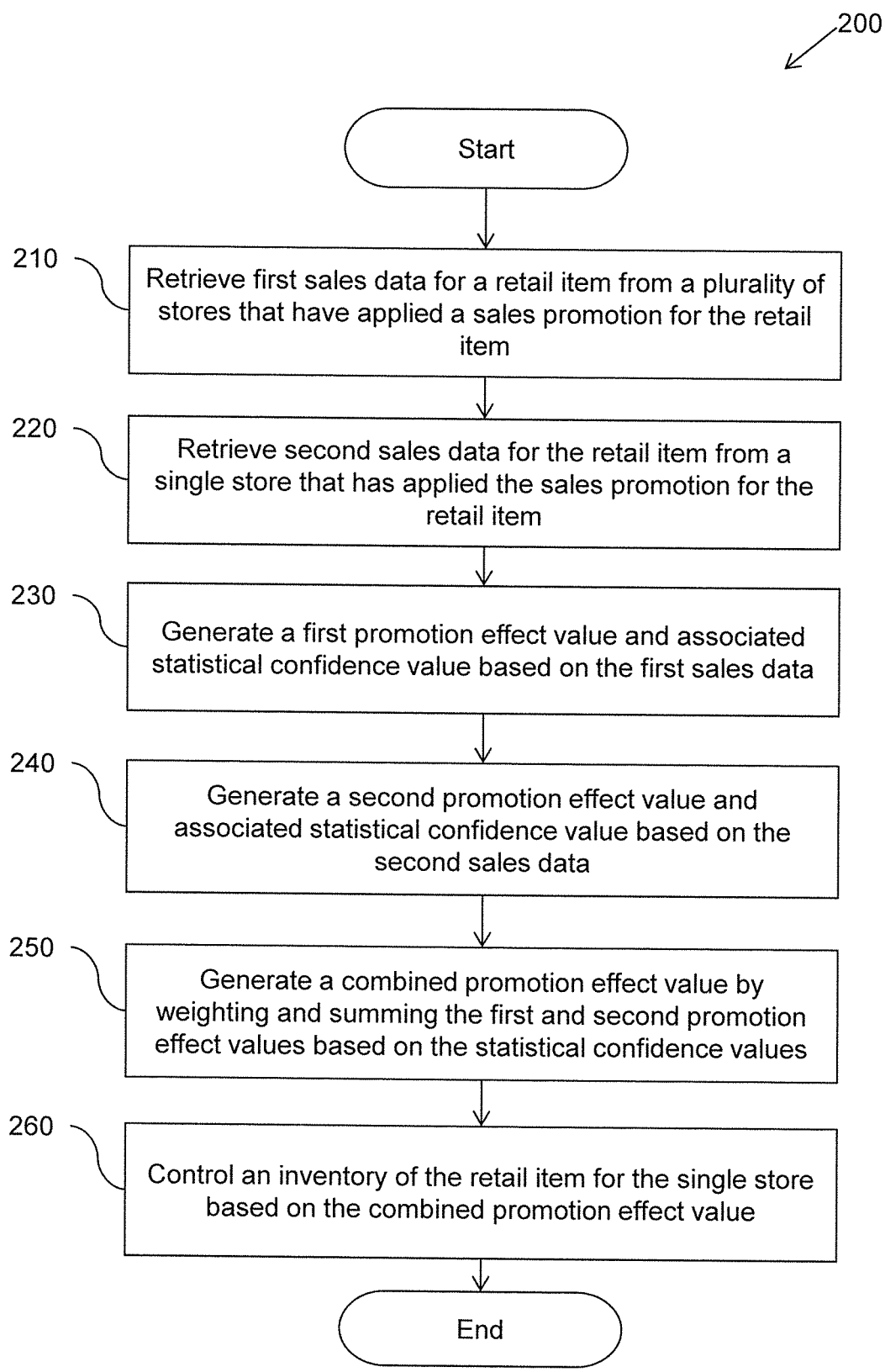
FIG. 2 illustrates one embodiment of a method, which can be performed by the promotion effects tool of the computer system of FIG. 1, for generating a combined promotion effect value (e.g., a profitability estimate)

FIG. 2 illustrates one embodiment of a computer-implemented method 200, which can be performed by the promotion effects tool 110 of the computer system 100 of FIG. 1, for generating promotion effect values. Method 200 describes operations of the promotion effects tool 110 and is implemented to be performed by the promotion effects tool 110 of FIG. 1, or by a computing device configured with an algorithm of the method 200. For example, in one embodiment, method 200 is implemented by a computing device configured to execute a computer application. The computer application is configured to process data in electronic form and includes stored executable instructions that perform the functions of method 200.

Method 200 will be described from the perspective that, for an item (e.g., a retail item) or a class of items sold via one or more sales channels (e.g., one or more retail stores), the item (or class of items) may be promoted in various ways over various times (retail periods). A retail calendar has many retail periods (e.g., weeks) that are organized in a particular manner (e.g., four (4) thirteen (13) week quarters) over a typical calendar year. A retail period may occur in the past or in the future.

In one embodiment, sales data includes unit sales and/or monetary sales and promotion information that has been recorded for an item (or for many items in a class) that has been sold in past retail periods (e.g., over 52 weeks of the past year). Sales data may be stored in the database device 170, for example. In accordance with one embodiment, the promotion effects tool 110 is configured to read sales data for an item from at least one data structure (e.g., from data structures in the database 170).

Again, a sales promotion may include, for example, one of a price discount promotion, a television advertisement promotion, a radio advertisement promotion, a newspaper advertisement promotion, an internet advertisement promotion, an email advertisement promotion, or an in-store advertisement promotion. Data associated with a promotion may include, for example, price discount data or Boolean data.

The price discount data may be numerical values that represent a fraction or percentage of a decrease in the price of the item (e.g., 0.270416 or 27.0416%). Boolean data may be numerical values of "0" and "1", for example, indicating that a promotion component is either active or inactive for a corresponding time period (i.e., either the item was promoted in accordance with a particular sales promotion during a particular time period or it was not).

Method 200 characterizes an effect on sales or profitability of a retail item due to a sales promotion for the retail item. Upon initiating method 200, at block 210, first sales data is retrieved, via network communications, for the retail item from multiple stores that have applied the sales promotion for the retail item. In one embodiment, visual user interface logic 120 of the promotion effects tool 110 of FIG. 1 facilitates the retrieving of the first sales data from, for example, the database device 170. The first sales data may reside in a first data structure stored in a first memory of the computing device 105, for example, once retrieved. The multiple stores may include multiple physical stores, multiple on-line stores, or at least one physical store and at least one on-line store.

In one embodiment, the first sales data is associated with a retail item for multiple sales channels. In another embodiment, the first sales data is associated with a class of items for multiple sales channels. In this way, the first sales data may be viewed as a type of aggregate data that can be used to generate the first promotion effect value as an aggregate promotion effect value.

At block 220, second sales data is retrieved, via network communications, for the retail item from a single store that has applied the sales promotion for the retail item. In one embodiment, visual user interface logic 120 of the promotion effects tool 110 of FIG. 1 facilitates the retrieving of the second sales data from, for example, the database device 170. The second sales data may reside in a second data structure stored in a second memory of the computing device 105, for example, once retrieved. The single store may be one of a physical store or an on-line store. In one embodiment, the single store may be one of the multiple stores.

In one embodiment, the second sales data is associated with a particular item (e.g., a single retail item) sold at a particular sales channel (e.g., a single store). In another embodiment, the second sales data is associated with a class of items for a single sales channel. In this way, the second sales data may be viewed as a type of granular data that can be used to generate the second promotion effect value as a granular promotion effect value.

At block 230, a first promotion effect value (e.g., a first profitability estimate) and an associated first statistical confidence value is generated by performing a first regression analysis on the first sales data. The first promotion effect value characterizes and effect on sales (e.g. profitability) of the retail item as sold by the multiple stores due to the sales promotion. The first statistical confidence value represents a confidence in the first promotion effect value. In accordance with one embodiment, block 230 is performed by first regression logic 130 of the promotion effects tool 110 of FIG. 1.

In accordance with one embodiment, the first regression analysis may be based on a first demand forecast model for a class of items across multiple sales channels (an aggregate level). As an example, the first promotion effect value for the aggregate level may be generated by the first regression analysis in accordance with a first demand forecast model or algorithm, where at least a portion of the algorithm is represented by the following expression:

$$\text{sales}(i,l,t)=\text{base}(i,l,t)*e^{\text{gamma}(i,l)*\text{price\_off}(i,l,t)}*\Pi(p(i,l,k)*o(i,l,t,k)+1)$$

where sales(i,l,t) is the demand of the class of items i across multiple sales channels l for the period t.

base(i,l,t) is the base demand of i across l for the period t.

gamma(i,l) is the price elasticity of i across l.

price_off(i,l,t) is the price discount value of i across l for the period t.

p(i,l,k) is the promotion effect of promo k for i across l and will have an associated statistical confidence value (p-value).

o(i,l,t,k) is a Boolean indicator having a value of "1" if the promotion k is active for i across l for period t, otherwise the value is "0".

In accordance with one embodiment, the above expression for the first demand forecast model/algorithm may be put into the following linear form such that the first regression analysis may be performed as a linear regression analysis:

$$\log(\text{sales}) = \beta_0 + \text{gamma}*\text{price\_off} + \sum_{j \in K}(1 + \beta_j)$$

where $\exp(\beta_0)$ is the baseline demand, gamma is the price elasticity, and $\exp(\beta_j)$ is the promotion effect of promotion j. Other demand forecast models are possible as well, in accordance with various embodiments.

At block 240, a second promotion effect value (e.g., a second profitability estimate) and an associated second statistical confidence value is generated by performing a second regression analysis on the second sales data. The second promotion effect value characterizes and effect on sales (e.g. profitability) of the retail item as sold by the single store due to the sales promotion. The second statistical confidence value represents a confidence in the second promotion effect value. In accordance with one embodiment, block 240 is performed by second regression logic 140 of the promotion effects tool 110 of FIG. 1.

In accordance with one embodiment, the second regression analysis may be based on a second demand forecast model for a single item for a single sales channel (a granular level). As an example, in one embodiment, the promotion effect value for an item at the granular level may be generated (estimated) by the second regression analysis in accordance with a second demand forecast model or algorithm, where at least a portion of the algorithm is represented by the following expression:

$$\text{sales}(i,l,t)=\text{base}(i,l,t)*e^{\text{gamma}(i,l)*\text{price\_off}(i,l,t)}*\Pi(p(i,l,k)*o(i,l,t,k)+1)$$

where sales(i,l,t) is the demand of the item i at sales channel l for the period t.

base(i,l,t) is the base demand of i at l for the period t.

gamma(i,l) is the price elasticity of i at l.

price_off(i,l,t) is the price discount value of i at l for the period t.

p(i,l,k) is the promotion effect of promo k for the i at l and will have an associated statistical confidence value (p-value).

o(i,l,t,k) is a Boolean indicator having a value of "1" if the promotion k is active for i at l for period t, otherwise the value is "0".

In accordance with one embodiment, the above expression for the second demand forecast model/algorithm may be put into the following linear form such that the first regression analysis may be performed as a linear regression analysis:

$$\log(\text{sales}) = \beta_0 + \text{gamma} * \text{price\_off} + \sum_{j \in K} (1 + \beta_j)$$

where $\exp(\beta_0)$ is the baseline demand, gamma is the price elasticity, and $\exp(\beta_j)$ is the promotion effect of promotion j. Other demand forecast models are possible as well, in accordance with various embodiments.

It is noted here that the second demand forecast model is similar to the first demand forecast model, except for how the parameters i and l are defined. In the first demand forecast model (representing an aggregate scenario), i represents an item or a class of items and l represents multiple sales channels within, for example, a geographic region. In the second demand forecast model (representing a granular scenario), i represents a particular item and l represents a particular sales channel.

At block 250, a combined promotion effect value (e.g., a combined profitability estimate) is generated by weighting and summing the first promotion effect value (e.g., the first profitability estimate) and the second promotion effect value (e.g., the second profitability estimate) based on the first statistical confidence value and the second statistical confidence value. The combined promotion effect value characterizes a sales effect (e.g., profitability) of the retail item as sold by the single store due to the sales promotion. In one embodiment, block 250 is performed by combination logic 150 of the promotion effects tool 110 of FIG. 1.

At block 260, the combined promotion effect value (e.g., combined profitability estimate) is used to control an inventory of the retail item for the single store. For example, in one embodiment, an amount of inventory of the retail item to be ordered for the single store by a computerized inventory system is controlled based on the combined promotion effect value. In another embodiment, an amount of inventory of the retail item to be allocated to the single store by a computerized inventory system in controlled based on the combined promotion effect value. In a further embodiment, adjustment of an amount of inventory of the retail item at the single store by a computerized inventory system is controlled based on the combined promotion effect value.

The discussion below provides details and examples of how a first (aggregate level) promotion effect value may be combined with a second (granular level) promotion effect value based on statistical relevance:

As discussed above herein, the estimation of both the aggregate (e.g., multiple store) and granular (e.g., single store) level promotion effects is regression-based. The regression not only estimates the promotion effect for a promotion, but also gives a measure of confidence in the estimate, called a p-value. In general, the lower the p-value, the more confident is the estimate.

The promotion effects and their corresponding confidence measures are used to create the combined promotion effect by weighting the effects according to their statistical relevance. The methodology is detailed below herein.

STEP 1: Run Granular-Level (e.g., Single Store) Analysis:
estimate promotion effects at granular level: $p\_effect_{gran}$
calculate the statistical confidence of the promotion effect: $p\_value_{gran}$
STEP 2: Run Aggregate-Level Analysis:
estimate promotion effects at aggregate level: $p\_effect_{agg}$
calculate the statistical confidence of the promotion effect: $p\_value_{agg}$
STEP 3: Calculate the Blending Factor $\alpha$ According to:

$$\alpha = \frac{p\_value_{gran}}{(p\_value_{gran} + p\_value_{agg})}$$

STEP 4: Calculate the Combined Promotion Effect by Using the Aggregate and Granular Level Promotion Effects, as Well as the Blending Factor:

$$p\_effect_{combined} = \alpha * p\_effect_{agg} + (1-\alpha) * p\_effect_{gran}$$

The four steps illustrate the flow of events. Alternatively, steps 3 and 4 can be combined to give the following formula:

$$p\_effect_{combined} = \frac{p_{value_{gran}} * p_{effect_{agg}} + p_{value_{agg}} * p_{effect_{gran}}}{p_{value_{gran}} + p_{value_{agg}}}$$

In one embodiment, the functionality is implemented using steps 3 and 4, to make it possible for the user to overwrite the blending factor, if desired.

Example Scenarios

The following provides some examples of the outcome of the algorithm.

Scenario 1. Granular level promotion effect with a very high p-value (i.e., very low confidence), aggregate level promotion effect with a low p-value (i.e., high confidence):
$p\_effect_{gran}=2.4$
$p\_value_{gran}=0.05$
$p\_effect_{agg}=1.5$
$p\_value_{agg}=0.001$
The calculation of the resulting combined effect yields:

$$p\_effect_{combined} = \frac{0.05 * 1.5 + 0.001 * 2.4}{0.05 + 0.001} = 1.517$$

Note how the combined promotion effect value is very close to the aggregate (multi-store) level promotion effect value of 1.5 due to the very low confidence granular (single store) level effect.

Scenario 2. Granular level promotion effect with a high p-value (i.e., low confidence), aggregate level promotion effect with a low p-value (i.e., high confidence):
$p\_effect_{gran}=2.4$
$p\_value_{gran}=0.005$
$p\_effect_{agg}=1.5$
$p\_value_{agg}=0.001$
The calculation of the resulting combined effect yields:

$$p\_effect_{combined} = \frac{0.005 * 1.5 + 0.001 * 2.4}{0.005 + 0.001} = 1.65$$

Note how the combined promotion effect value starts to move in the direction of the granular (single store) level estimate.

Scenario 3. Granular and aggregate level promotion effects are similar in terms of confidence (similar p-values):
p_effect$_{gran}$=2.4
p_value$_{gran}$=0.005
p_effect$_{agg}$=1.5
p_value$_{agg}$=0.006
The calculation of the resulting combined effect yields:

$$p\_effect_{combined} = \frac{0.005*1.5 + 0.006*2.4}{0.005 + 0.006} = 1.99$$

Note how the combined promotion effect value is close to being an average of the granular level (single store) and aggregate level (multi-store) promotion effect values.

Scenario 4. Confident granular level effect and low-confidence aggregate level effect:
p_effect$_{gran}$=2.4
p_value$_{gran}$=0.001
p_effect$_{agg}$=1.5
p_value$_{agg}$=0.006
The calculation of the resulting combined effect yields:

$$p\_effect_{combined} = \frac{0.001*1.5 + 0.006*2.4}{0.001 + 0.006} = 2.27$$

Note how the confidence of the granular (single store) level effect pulls the combined promotion effect value very close to the granular level promotion effect estimate.

In this manner, aggregate (multi-store) and granular (single store) promotion effects may be blended (combined), resulting in a single store promotion effect that better represents actual effects of a sales promotion of the retail item caused by or due to the sees promotion. The combined promotion effect value is more accurate than that which can be achieved using data from only a single store. The blending uses an analytically sound approach that weights the multi-store and single store promotion effect values according to the statistical relevance of their estimations.

A demand forecast model can use the combined promotion effect value for a sales promotion to predict future demand for an item and control inventory. Order quantities may be adjusted, based on the predicted future demand for the item, to improve sales and reduce inventory costs. A reduction in inventory cost of as little as 1% can amount to millions of dollars in savings per year for some retailers. Furthermore, a retailer can more accurately manage inventory of merchandise by accounting for the effects of the individual promotion components or an inaccurate demand forecast for the merchandise.

Computing Device Embodiment

Figure 3:
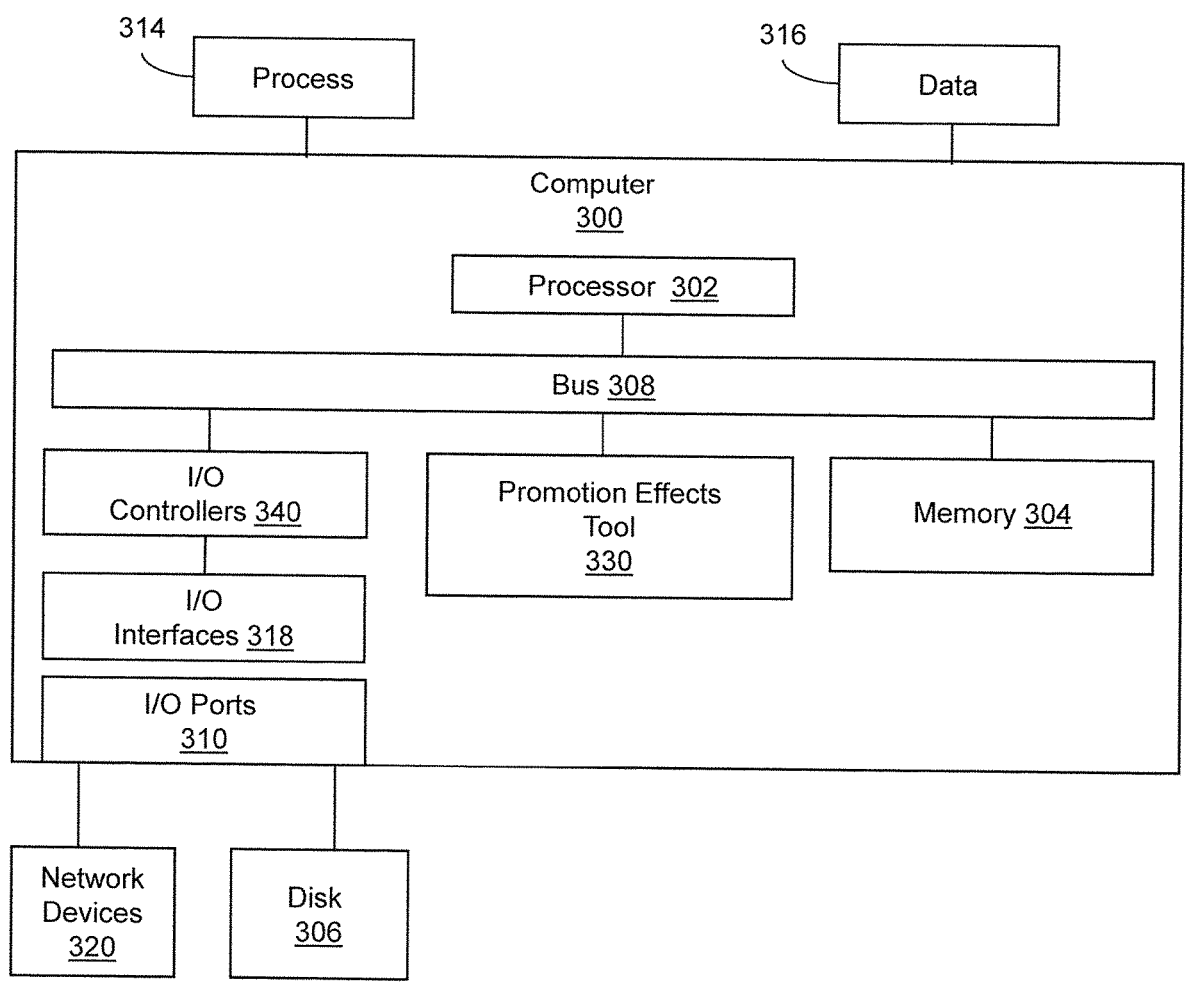
FIG. 3 illustrates one embodiment of a computing device upon which a promotion effects tool of a computing system may be implemented.

FIG. 3 illustrates an example computing device that is configured and/or programmed with one or more of the example systems and methods described herein, and/or equivalents. FIG. 3 illustrates one example embodiment of a computing device upon which an embodiment of a promotion effects tool may be implemented. The example computing device may be a computer 300 that includes a processor 302, a memory 304, and input/output ports 310 operably connected by a bus 308.

In one example, the computer 300 may include promotion effects tool 330 (corresponding to promotion effects tool 110 from FIG. 1) configured with a programmed algorithm as disclosed herein to analyze sales data and generate promotion effect values in a blended manner. In different examples, the tool 330 may be implemented in hardware, a non-transitory computer-readable medium with stored instructions, firmware, and/or combinations thereof. While the tool 330 is illustrated as a hardware component attached to the bus 308, it is to be appreciated that in other embodiments, the tool 330 could be implemented in the processor 302, a module stored in memory 304, or a module stored in disk 306.

In one embodiment, tool 330 or the computer 300 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the generation of blended (combined) promotion effect values. The means may also be implemented as stored computer executable instructions that are presented to computer 300 as data 316 that are temporarily stored in memory 304 and then executed by processor 302.

Tool 330 may also provide means (e.g., hardware, non-transitory computer-readable medium that stores executable instructions, firmware) for facilitating the generation of combined promotion effect values.

Generally describing an example configuration of the computer 300, the processor 302 may be a variety of various processors including dual microprocessor and other multi-processor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD ROM, and so on. The memory 304 can store a process 314 and/or a data 316, for example. The disk 306 and/or the memory 304 can store an operating system that controls and allocates resources of the computer 300.

The computer 300 may interact with input/output devices via the i/o interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the i/o interfaces 318, and/or the i/o ports 310. Through the network devices 320, the computer 300 may interact with a network. Through the network, the computer 300 may be logically connected to remote computers. Networks with which the computer 300 may interact include, but are not limited to, a LAN, a WAN, and other networks.

Systems, methods, and other embodiments have been described that are configured to characterize a sales effect (e.g., profitability) of a retail item due to a sales promotion for the retail item. In one embodiment, first sales data is retrieved, via network communications, for the retail item from a plurality of stores that have applied the sales promotion for the retail item. Second sales data is retrieved, via the network communications, for the retail item from a single store that has applied the sales promotion for the retail item. A first promotion effect value (e.g., a first profitability estimate) and an associated confidence value is generated, via first regression logic, by performing a first regression analysis on at least the first sales data. The first promotion effect value characterizes an effect on sales (e.g., profitability) of the retail item as sold by the plurality of stores due to the sales promotion. The first statistical confidence value represents a confidence in the first promotion effect value. A second promotion effect value (e.g., a second profitability estimate) and an associated second statistical confidence value is generated, via second regression logic, by performing a second regression analysis on at least the second sales data. The second promotion effect value characterizes a sales effect (e.g., profitability) of the retail item as sold by the single store due to the sales promotion. The second statistical confidence value represents a confidence in the second promotion effect value.

A combined promotion effect value (e.g., a combined profitability estimate) is generated, via combination logic, by weighting and summing the first promotion effect value (e.g., the first profitability estimate) and the second promotion effect value (e.g., the second profitability estimate) based on the first statistical confidence value and the second statistical confidence value. The combined promotion effect value characterizes an effect on sales (e.g., profitability) of the retail item as sold by the single store due to the sales promotion. The combined promotion effect value may be used to control at least one of an amount of inventory of the retail item to be ordered for the single store, an amount of inventory of the retail item to be allocated to the single store, or an adjustment of an amount of inventory of the retail item at the single store.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least a processor for executing instructions from a memory, the method comprising:
    characterizing profitability of a retail item, due to a sales promotion for the retail item, by:
        retrieving first sales data, by network communications, for the retail item from a plurality of stores that have applied the sales promotion for the retail item;
        determining, by at least the processor, a first profitability estimate for the retail item as sold by the plurality of stores from the first sales data, wherein the first profitability estimate characterizes profitability of the retail item as sold by the plurality of stores due to the sales promotion;
        retrieving second sales data, by the network communications, for the retail item from a single store that has applied the sales promotion for the retail item;
        determining, by at least the processor, a second profitability estimate for the retail item as sold by the single store from the second sales data wherein the second profitability estimate characterizes profitability of the retail item as sold by the single store due to the sales promotion;
    generating a combined profitability estimate, by at least the processor, at least by
        (i) determining a first statistical confidence value associated with the first profitability estimate by performing a first regression analysis on the first sales data, wherein the first statistical confidence value represents a confidence in the first profitability estimate,
        (ii) weighting the first profitability estimate by the first statistical confidence value,
        (iii) determining a second statistical confidence value associated with the second profitability estimate by performing a second regression analysis on the second sales data, wherein the second statistical confidence value represents a confidence in the second profitability estimate,
        (iv) weighting the second profitability estimate by the second statistical confidence value, and
        (v) summing the weighted profitability estimates, wherein the combined profitability estimate characterizes profitability of the retail item as sold by the single store due to the sales promotion, and wherein the generation of the combined profitability estimate includes determining the combined profitability estimate by performing the weighting and summing of the first profitability estimate and the second profitability estimate based on the first statistical confidence value and the second statistical confidence value;

determining an amount of inventory of the retail item for the single store based at least in part on the combined profitability estimate;

generating an electronic order for the determined amount of inventory; and placing the generated order.

2. The method of claim 1, wherein the plurality of stores includes at least one physical store and at least one on-line store.

3. The method of claim 1, wherein the single store is an on-line store.

4. The method of claim 1, wherein the sales promotion includes at least one of a television advertisement promotion, a radio advertisement promotion, a newspaper advertisement promotion, an internet advertisement promotion, an email advertisement promotion, or an in-store advertisement promotion.

5. The method of claim 1, wherein the plurality of stores includes the single store.

6. The method of claim 1, wherein the first regression analysis is based on a demand forecast model for a class of multiple types of retail items.

7. The method of claim 1, wherein the second regression analysis is based on a demand forecast model for a single retail item, and wherein the demand forecast model is expressed as the demand of the class of items within a single sales channel for a period of time is equal to the baseline demand for the class of items within the single sales channel for the period of time multiplied by (i) a constant to the power of a price elasticity of the class of items within the single sales channel times a price discount value of the class of items within the single sales channel for the period of time, and (ii) a product of all promotion effects active within the single sales channel during the period of time.

8. The method of claim 1, wherein the first regression analysis is based on a demand forecast model for a plurality of stores.

9. The method of claim 1, wherein the second regression analysis is based on a demand forecast model for a single store.

10. A non-transitory computer-readable medium storing computer-executable instructions that, when executed by a computer, cause the computer to perform functions, wherein the instructions comprise:

instructions for characterizing an effect on sales of a retail item, due to a sales promotion for the retail item, by:

retrieving first sales data for the retail item from a plurality of stores that have applied the sales promotion for the retail item;

determining, by at least the processor, a first profitability estimate for the retail item as sold by the plurality of stores from the first sales data, wherein the first profitability estimate characterizes profitability of the retail item as sold by the plurality of stores due to the sales promotion;

retrieving second sales data for the retail item from a single store that has applied the sales promotion for the retail item;

determining, by at least the processor, a second profitability estimate for the retail item as sold by the single store from the second sales data, wherein the second profitability estimate characterizes profitability of the retail item as sold by the single store due to the sales promotion;

generating a combined promotion effect value at least by (i) determining a first statistical confidence value associated with the first profitability estimate by performing a first regression analysis on the first sales data, wherein the first statistical confidence value represents a confidence in the first profitability estimate, (ii) weighting the first profitability estimate by the first statistical confidence value, (iii) determining a second statistical confidence value associated with the second profitability estimate by performing a second regression analysis on the second sales data, wherein the second statistical confidence value represents a confidence in the second profitability estimate, (iv) weighting and the second profitability estimate by the second statistical confidence value, and (v) summing the weighted profitability estimates, wherein the combined promotion effect value characterizes an effect on sales of the retail item as sold by the single store due to the sales promotion, and wherein the generation of the combined profitability estimate includes determining the combined profitability estimate by performing the weighting and summing of the first profitability estimate and the second profitability estimate based on the first statistical confidence value and the second statistical confidence value;

instructions for determining an amount of inventory of the retail item for the single store based at least in part on the combined profitability estimate;

instructions for generating an electronic order for the determined amount of inventory; and instructions for placing the generated order.

11. The non-transitory computer-readable medium of claim 10, wherein the instructions for generating the combined promotion effect value include instructions for performing a regression analysis based on a demand forecast model for a class of retail items and a plurality of stores, wherein the demand forecast model is expressed as the demand of the class of items across multiple sales channels for a period of time is equal to the baseline demand for the class of items across the multiple sales channels for the period of time multiplied by (i) a constant to the power of a price elasticity of the class of items across the multiple sales channels times a price discount value of the class of items across the multiple sales channels for the period of time, and (ii) a product of all promotion effects active across the multiple sales channels during the period of time.

12. The non-transitory computer-readable medium of claim 10, wherein the instructions for generating the combined promotion effect value include instructions for performing a regression analysis based on a demand forecast model for a single retail item and a single store.

13. The non-transitory computer-readable medium of claim 10, wherein the instructions further include instructions for displaying at least the combined promotion effect value on a display screen of a computing device.

14. The method of claim 10, wherein the amount of inventory of the retail item is the amount to satisfy future demand forecast for the item at the single store by a demand forecast model using the combined promotion effect value.

15. A computing system, comprising:

a processor;

a memory operably connected to the processor;

a non-transitory computer-readable medium operably connected to the processor and memory and storing computer-executable instructions that when executed by at least the processor cause the computing system to: characterize profitability of a retail item, due to a sales promotion for the retail item, by:

retrieving first sales data, by network communications, for the retail item from a plurality of stores that have applied the sales promotion for the retail item;

determining, by at least the processor, a first profitability estimate for the retail item as sold by the plurality of stores from the first sales data, wherein the first profitability estimate characterizes profitability of the retail item as sold by the plurality of stores due to the sales promotion;

retrieving second sales data, by the network communications, for the retail item from a single store that has applied the sales promotion for the retail item;

determining, by at least the processor, a second profitability estimate for the retail item as sold by the single store from the second sales data, wherein the second profitability estimate characterizes profitability of the retail item as sold by the single store due to the sales promotion;

generating a combined profitability estimate, by at least the processor, at least by (i) determining a first statistical confidence value associated with the first profitability estimate by performing a first regression analysis on the first sales data, wherein the first statistical confidence value represents a confidence in the first profitability estimate, (ii) weighting the first profitability estimate by the first statistical confidence value, (iii) determining a second statistical confidence value associated with the second profitability estimate by performing a second regression analysis on the second sales data, wherein the second statistical confidence value represents a confidence in the second profitability estimate, (iv) weighting the second profitability estimate by the second statistical confidence value, (v) summing the weighted profitability estimates, wherein the combined profitability estimate characterizes profitability of the retail item as sold by the single store due to the sales promotion, and wherein the generation of the combined profitability estimate includes determining the combined profitability estimate by performing the weighting and summing of the first profitability estimate and the second profitability estimate based on the first statistical confidence value and the second statistical confidence value;

determine an amount of inventory of the retail item for the single store based at least in part on the combined profitability estimate;

generate an electronic order for the determined amount of inventory; and place the generated order.

16. The computing system of claim 15, wherein the plurality of stores includes a plurality of on-line stores.

17. The computing system of claim 15, wherein the single store is one of a physical store or an on-line store.

18. The computing system of claim 15, wherein the sales promotion includes at least one of a price discount promotion, a television advertisement promotion, a radio advertisement promotion, a newspaper advertisement promotion, an internet advertisement promotion, an email advertisement promotion, or an in-store advertisement promotion.

19. The computing system of claim 15, wherein the plurality of stores includes the single store.

* * * * *